(12) United States Patent
Hille

(10) Patent No.: US 11,387,663 B2
(45) Date of Patent: Jul. 12, 2022

(54) PIECE OF FURNITURE AND ELECTROMOTIVE FURNITURE DRIVE COMPRISING A CHARGING APPARATUS

(71) Applicant: DEWERTOKIN GMBH, Kirchlengern (DE)

(72) Inventor: Armin Hille, Bielefeld (DE)

(73) Assignee: Dewertokin Technology Group Co., Ltd, Jiaxing (CN)

( * ) Notice: Subject to any disclaimer, the term of this patent is extended or adjusted under 35 U.S.C. 154(b) by 111 days.

(21) Appl. No.: 16/491,412

(22) PCT Filed: Mar. 6, 2018

(86) PCT No.: PCT/EP2018/055428
§ 371 (c)(1),
(2) Date: Sep. 5, 2019

(87) PCT Pub. No.: WO2018/162458
PCT Pub. Date: Sep. 13, 2018

(65) Prior Publication Data
US 2020/0036202 A1    Jan. 30, 2020

(30) Foreign Application Priority Data

Mar. 6, 2017 (DE) .................... 10 2017 104 635.6

(51) Int. Cl.
*H02J 7/00* (2006.01)
*A47C 17/04* (2006.01)
(Continued)

(52) U.S. Cl.
CPC ............ *H02J 7/0045* (2013.01); *A47C 17/04* (2013.01); *A47C 21/00* (2013.01); *H02J 7/00* (2013.01); *H02J 7/025* (2013.01); *H02J 2207/20* (2020.01)

(58) Field of Classification Search
CPC .............................. H02J 7/0045; A47C 17/04
(Continued)

(56) References Cited

U.S. PATENT DOCUMENTS

2009/0289596 A1   11/2009 McGinley et al.
2011/0148358 A1   6/2011 Lee
(Continued)

FOREIGN PATENT DOCUMENTS

DE   102007030473 A1   1/2009
GB      2525712 A      11/2015
(Continued)

OTHER PUBLICATIONS

International Search Report issued by the European Patent Office dated May 18, 2018 in International Application PCT/EP2018/055428.

*Primary Examiner* — Suchin Parihar
(74) *Attorney, Agent, or Firm* — Henry M. Feiereisen LLC

(57) ABSTRACT

The invention relates to an electromotive furniture drive comprising at least one adjusting drive (7, 8) for electromotively adjusting at least one movable furniture part relative to further furniture parts, and comprising a control device (9) for actuating the at least one adjusting drive (7, 8), and also comprising a charging apparatus (10) having at least one charging connection (11) for supplying power to an external electronic device. The electromotive furniture drive is distinguished in that the charging apparatus (10) has a cable (13) for connection to the control device (9), wherein the cable (13) leads from the control device (9) to a voltage converter (112) to which the at least one charging connection (11) is connected. The invention further relates to an item of furniture, in particular an item of furniture for sleeping or
(Continued)

resting on, comprising an electromotive furniture drive of this kind comprising a charging apparatus (10).

17 Claims, 3 Drawing Sheets

(51) Int. Cl.
*A47C 21/00* (2006.01)
*H02J 7/02* (2016.01)

(58) Field of Classification Search
USPC .......................................................... 320/107
See application file for complete search history.

(56) References Cited

U.S. PATENT DOCUMENTS

| | | | |
|---|---|---|---|
| 2017/0112716 A1* | 4/2017 | Rawls-Meehan | A61G 7/015 |
| 2017/0221350 A1* | 8/2017 | Hille | G08C 17/00 |
| 2017/0318977 A1* | 11/2017 | Rawls-Meehan | A47C 27/00 |
| 2017/0318982 A1* | 11/2017 | Campbell | A47C 21/003 |
| 2018/0103768 A1* | 4/2018 | Nava | A47C 19/02 |
| 2018/0338625 A1* | 11/2018 | Nava | A47C 19/021 |
| 2020/0060429 A1* | 2/2020 | Schulte | H01R 25/006 |

FOREIGN PATENT DOCUMENTS

| | | |
|---|---|---|
| WO | WO 2013/127950 A1 | 9/2013 |
| WO | WO 2016/064839 A1 | 4/2016 |

\* cited by examiner

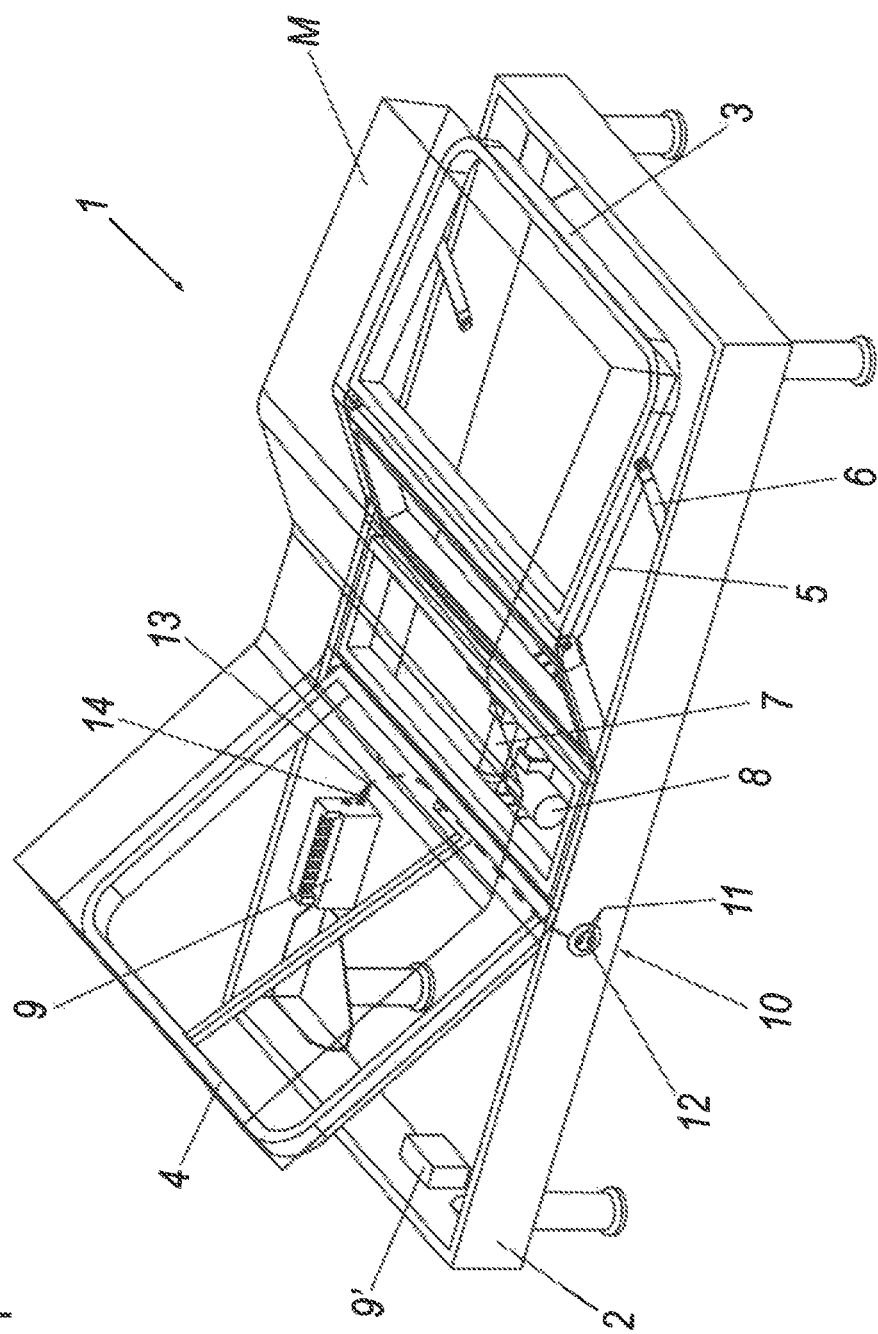

US 11,387,663 B2

PIECE OF FURNITURE AND ELECTROMOTIVE FURNITURE DRIVE COMPRISING A CHARGING APPARATUS

CROSS-REFERENCES TO RELATED APPLICATIONS

This application is the U.S. National Stage of International Application No. PCT/EP2018/055428, filed Mar. 6, 2018, which designated the United States and has been published as International Publication No, WO 2018/162458 A1 and which claims the priority of German Patent Application, Serial No. 10 2017 104 635.6, filed Mar. 6, 2017, pursuant to 35 U.S.C. 119(a)-(d).

BACKGROUND OF THE INVENTION

The invention relates to an electromotive furniture drive having at least one adjusting drive for the electromotive adjustment of at least one movable furniture part relative to further furniture parts and a control device for actuating the at least one adjusting drive, as well as a charging apparatus having at least one charging connection for the supplying power to an external electronic device. The invention also relates to a piece of furniture, in particular a sleeping or resting piece of furniture, having such an electromotive furniture drive.

Electromotive furniture drives in sleeping or resting furniture, such as beds, sofa beds or recliners, make it easy to set a suitable sleeping or resting position. With beds, for example, a back or leg part can be raised or lowered in relation to a middle section of the bed.

Mobile communication or media devices are usually equipped with a rechargeable battery that can be powered and recharged via a charging port, often a USB (Universal Serial Bus) port.

In order to be able to use and charge such electronic devices also in the area of a piece of furniture, e.g. sleeping or resting furniture, without having to use an additional charger, e.g. in the form of a plug-in power supply unit, electromotive furniture drives with a charging apparatus and a charging connection are known. It is exploited that these electromotive furniture drives are either equipped with an integrated power supply unit for their own power supply or are at least connected to an external power supply unit. Thanks to the integrated charging apparatus, this existing power supply unit can also be used to operate or charge the external electronic devices, thus eliminating the need for additional cabling in the furniture area, in particular lighting cabling with additional sockets.

Since the charging apparatuses at the charging connection normally provide a much lower voltage than is available within the electromotive furniture drive, voltage converters are integrated in the electromotive furniture drives, usually in a control device thereof, which convert the DC voltage used by the furniture drive, which is usually in the range of 24-30 volts (V), into a voltage of usually 5V for the charging apparatuses. The mentioned 5V are valid e.g. for the universally used USB charging ports.

Since the control devices of electromotive furniture drives may be mounted in positions that are not easily accessible in the furniture area, it is known that the charging connections are positioned elsewhere in the furniture, e.g. with the aid of a mounting box that is positioned on the piece of furniture or installed in a suitable position in the furniture, and connected to the voltage converter in the control unit of the electromotive furniture drive via an appropriate low-voltage cable.

In contrast to a plug-in power supply unit positioned subsequently by the user in the furniture area, in this case the cable between the electromotive furniture drive and the charging connection can be laid less disturbingly in the furniture area. However, depending on the arrangement of the charging connection on the furniture and the position of the control unit within the furniture, cable lengths of up to several meters are required. Due to the far from inconsiderable current that must be available for the charging connections and that can be in the range of a few amperes per charging connection, relatively large cable cross-sections are required, which make the cables expensive and bulky.

In addition to the arrangement of a charging connection on a box permanently installed on or in the furniture, it is also possible to install the charging connection in a manual control unit which is available for operating the electromotive furniture drive. Such a manual control unit, also known as a hand switch, is often wired and has a spiral cable, for example. In this arrangement, the large cable cross-section required for the charging connection is particularly obstructive. Special cables can be used in which at least two conductors for supplying the charging connection have a higher conductor cross-section than the others, which are only used to transmit control signals. At least one charging connection, which is usually not so loadable with high current, can be integrated into the handset in this way. The special cables, however, are considerably more expensive and worse to maintain than spiral cables with cores of the same cross-section.

It is the object of the present invention to create an electromotive furniture drive of the type mentioned above, in which at least one charging connection powered by the electromotive furniture drive can be positioned away from it, wherein cables with smaller conductor cross-sections and therefore more favorable bending and laying properties can be used. The arrangement should preferably be able to supply several charging connections. It is another object to describe a piece of furniture having an electromotive furniture drive and at least one charging connection.

SUMMARY OF THE INVENTION

This object is solved by an electromotive furniture drive with a charging apparatus and a piece of furniture with such an electromotive furniture drive with the features of the respective independent claim. Advantageous embodiments and further developments are the subject of the dependent claims.

In the case of a furniture drive in accordance with the invention, the charging apparatus has a cable for connection to the control device or for connection to a power supply unit for supplying the control device, wherein the cable leads from the control device or the power supply unit to a voltage converter to which the at least one charging connection is connected.

In accordance with the invention, a voltage converter is thus provided in the immediate vicinity of at least one charging connection. A spatial distance of a few centimeters (cm), preferably less than 5 cm, is to be understood as immediate vicinity here. A voltage provided at the charging connection is therefore only brought to the correct voltage value near the charging connection, not already in the control unit or by a separate power supply unit. The cable is preferably supplied with an operating voltage by the control device or by a power supply unit for supplying the control device or for supplying the furniture with an operating voltage which is greater than a voltage provided at at least one charging connection, in particular the operating voltage is preferably greater by a factor of at least 4, in particular at least 5, than the voltage provided at the charging connection.

Correspondingly, the current in the cable is smaller by the factor mentioned. In order to be able to transmit the same power with the same losses, the cross-section of the cores in the cable can be reduced by the same factor. This makes the cable more cost-effective and easier to bend. For example, the operating voltage can be in the range of 24 to 30V, i.e. a typical operating voltage for electromotive furniture drives. The voltage provided on at least one charging connection, on the other hand, can only be 5V, e.g. if the at least one charging connector is designed as a USB socket.

The voltage converter used is preferably a switching converter with low losses. The voltage converter can comprise a hybrid module in which semiconductor components and passive components are integrated. This results in a particularly small size. The integrated passive components can in particular also be those which transmit power or energy within the framework of voltage conversion, for example an inductor, e.g. a coil, (by remagnetization processes) and/or a capacitor (by recharging processes).

If the voltage converter has both a power-transmitting capacitor and a power-transmitting inductor, both elements can be formed in the hybrid module, especially if the voltage converter is suitable for the transmission of only low powers. Alternatively, it is also possible to design the voltage converter as a hybrid module with inductor as an independent component. In order to take advantage of the compact design, the inductor is sealed and preferably arranged directly on the hybrid module. During operation of the voltage converter, heat may be generated in the inductor, which may be more easily dissipated if the inductor is arranged externally than if the inductor is integrated into the hybrid module. A first arrangement provides for the inductor to be arranged next to the hybrid module. A further and alternative arrangement provides for the hybrid module and the inductor to be arranged one above the other, which advantageously improves the area-related compactness.

Furthermore, at least one charging connection and the voltage converter are preferably arranged on a common circuit board. In this way a short cable length between voltage converter and charging connection is given and a compact assembly is formed.

The spatial distance between the output terminals of the voltage converter and the supply terminals of the charging connection is therefore very small so that a voltage drop along the said line length and thus along these supply lines is as small as possible. The cross-section of the conductor paths of these supply lines can thus be optimized in such a way that the compact design is further improved. In an initial embodiment, the cable length is less than 7 centimeters (cm). If the voltage converter and charging connection can be arranged very compactly, the length is less than 2 cm. If the voltage converter and charging connection are located on opposite sides of a printed circuit board, the length may be further reduced and may even be less than 1 cm.

In an advantageous embodiment of the electromotive furniture drive, the at least one charging connection is built into a mounting socket, which in turn can be arranged on a piece of furniture or embedded in a piece of furniture. The charging connection can thus be elegantly integrated into the furniture, yet also easily retrofitted.

In another advantageous embodiment of the electromotive furniture drive, the at least one charging connection is built into a manual control unit which has operating elements for controlling the at least one adjusting drive.

The charging connection is particularly easily accessible when installed in such a wired manual control unit and any additional wiring in or on the furniture can be omitted since the operating voltage potential of the electromotive furniture drive is already present at one plug or at the wires of the cable of the wired manual control unit. Without having to change components of the electromotive furniture drive such as the control device, for example, a wired manual control unit with integrated charging apparatus and voltage converter can now be used in the simplest way. Spiral cables are often used to connect the manual control unit to the control device. As a result of the design of the charging apparatus according to the invention with the voltage converter adjacent to the charging connection, a (spiral) cable having supply cores connected to the voltage converter and control cores connected to the operating elements can be advantageously used, wherein the supply cores and the control cores have the same conductor cross-section. The use of special cables, which offer a larger cable cross-section for the supply cores than for the control cores, is not necessary. Furthermore, the easy handling and the user comfort of a spiral cable, which is light, highly flexible, easy to manufacture and easy to assemble, are also guaranteed. These characteristics of the spiral cable are advantageous both for the production of the manual control unit and for its user.

A particularly advantageous embodiment of a manual control unit, which is compact and easy to install, provides that the charging connection and the manually operated operating elements for controlling the at least one adjusting drive are arranged in a common housing. The housing of a manual control unit or mobile handset is formed in a closed way. A manual control unit that can be permanently connected to the furniture can alternatively have an open housing. As an advantageous further development, the at least one charging connection, as well as the voltage converter and the push-button switches assigned to the adjusting drive are arranged on a common circuit board. Alternatively, a separate circuit board can also be provided here to accommodate the charging connection and the voltage converter, which can create a type of modular system for the manual control unit and the manual control unit can be designed with or without charging connection.

A special embodiment of the voltage converter and the charging apparatus includes an automatic charging current adjustment procedure. The voltage converter is based on the requirements of the device connected to the charging connection and adjusts the current flow according to its specifications. In this case, an information flow to the voltage converter or to the charging apparatus takes place, wherein the level of the current flow corresponds to the information content of the information flow. An exemplary information flow or information content is formed by at least one data set.

Furthermore, voltage converters and/or charging apparatuses are equipped with sensors for heat and a current flow level. Both the heat development of the charging apparatus and/or the voltage converter as well as the level of the current flow through the voltage converter are detected. When a threshold value for heat or current flow is reached, the charging process is intervened in a regulating or alternatively controlling way, which causes a limitation of the heat development and/or the current flow or, if necessary, switches off the current flow.

A piece of furniture according to the invention, in particular sleeping or resting furniture, is characterized by such an electromotive furniture drive with charging apparatus. This results in the advantages described in connection with the electromotive furniture drive.

BRIEF DESCRIPTION OF THE DRAWING

The invention will be explained in more detail below by reference to embodiment examples and figures, wherein:

FIG. 1 shows an embodiment example of a piece of furniture with an electromotive furniture drive and a charging apparatus;

DETAILED DESCRIPTION OF PREFERRED EMBODIMENTS

Figure 2A:
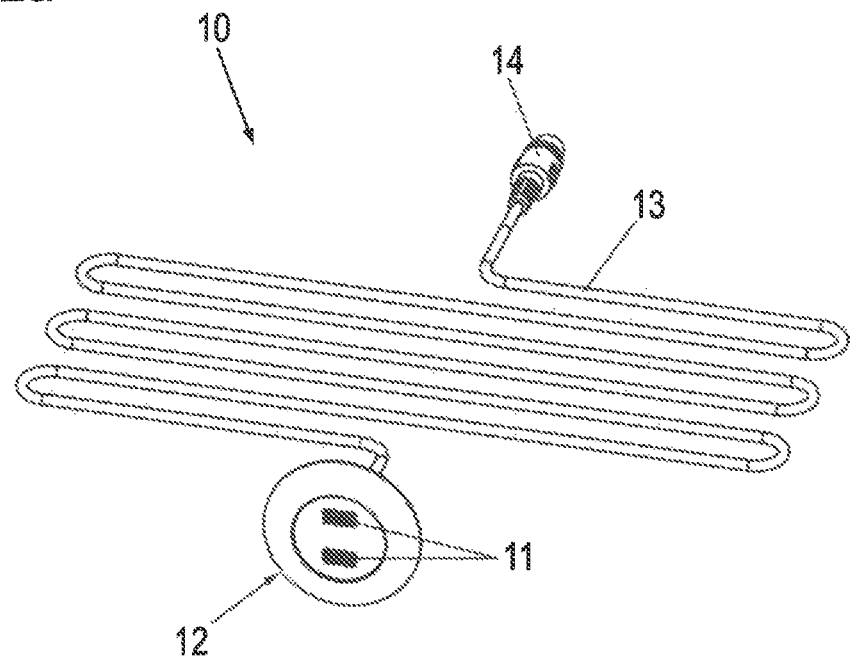
FIGS. 2a, b show the charging apparatus from FIG. 1 in various illustrations.

FIG. 1 shows a bed 1 as an example of a piece of furniture with an electromotive furniture drive. Bed 1 has at least one support element 3 to accommodate an upholstery or a mattress M, for example. Bed 1 is equipped with at least one support element 3. Bed 1 can be designed as a single bed for one person or as a double bed for several persons. The support element 3 is designed e.g. as a slatted frame, as a flat supporting surface or the like and is mounted on or inserted into a base element 2, here a frame with feet, with which the bed 1 is set up at an installation location, e.g. a floor.

In the example shown, support element 3 has a back part 4 and a leg part 5 which are movably mounted relative to a fixed middle part or relative to the base element 2. This movable arrangement is realized here by means of a so-called motion fitting 6. The movement is designed to be displaceable and/or pivotable.

The movably mounted back part 4 and the leg part 5 are each coupled to an electromotive adjusting drive 7, 8. The back part 4 is coupled to the electromotive adjusting drive 7. The electromotive adjusting drive 8 is provided for moving or adjusting the leg part 5.

The electromotive adjusting drives 7, 8 are designed as linear drives. The linear drives have one or a number of electric motors, wherein each electric motor is followed by a speed reduction gear having at least one gear stage. The speed reduction gear can be followed by another gear, for example in the form of a threaded spindle gear, which generates a linear movement of an output element from the rotary motion of the electric motor. The last gear member or a further member connected to it forms the output member. The output member of the respective electromotive adjusting drive is connected to the respective furniture component (back part 4, leg part 5) or alternatively to a component connected to the base element 2, so that, when the electric motor of the respective adjusting drive 7, 8 is operated, the movable furniture components 4, 5 are adjusted relative to one another or relative to the base element 2.

The electromotive adjusting drives 7, 8 are connected to a control unit 9. This connection can be designed, for example, as a pluggable cable connection, which is not shown here in detail.

In the example shown, control unit 9 is connected to an external power supply unit 9', which can be connected to a mains plug with a mains connection via a mains cable not shown in this example. The external power supply 9' provides a DC voltage in the range of 24-30V for the power supply of the electromotive furniture drive, in particular the electromotive adjusting drives 7, 8. In an alternative embodiment, a power supply unit can be integrated in the control unit 9 so that the external power supply unit 9' can be dispensed with and the control unit 9 can be connected directly to the mains with a mains cable.

Connected to the control unit 9 is a charging apparatus 10 with two charging connections 11 shown here. In the illustrated example, the charging connections 11 are designed according to the USB specification and are therefore also referred to as USB sockets 11 in the following. The USB sockets 11 are easily accessible in a mounting box 12 in the area of the base element 2 on bed 1. The exact positioning is exemplary here and should only show that an arrangement in the furniture is possible in an easily accessible place, even if the control unit 9 is not positioned so easily accessible and more remotely in the furniture. The mounting box 12 is connected via a cable 13 with plug 14 to a connection socket of the control unit 9. The cable 14 is shown dashed in FIG. 1.

Figure 2B:
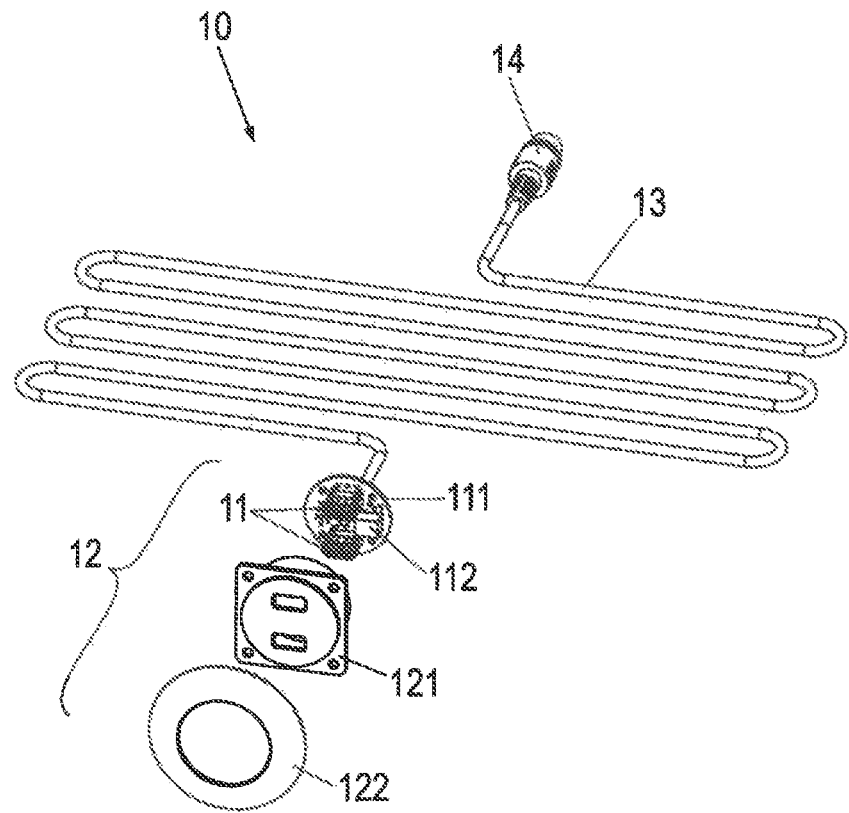

In FIGS. 2a and 2b the charging apparatus 10 from FIG. 1 is shown separately. In FIG. 2b the mounting box 12, which is shown in FIG. 2a in the assembled state, is shown open in the form of an exploded view to allow a view into the inner structure.

The mounting box 12 has a housing 121, which in this example is inserted into a cut-out in the furniture and fastened in the area of a flange resting thereon, e.g. it is screwed in. A snap-on mounting is also conceivable. The flange is then covered by a cover plate 122. The housing 121 has openings at the front through which USB sockets 11 can be accessed. A circuit board 111 is positioned in the housing 121, which is connected to the cable 13.

A rear cover, which is not shown in these figures, can also be provided for the housing 121, which preferably also offers a strain relief for the cable 13.

As can be seen from FIG. 2b, the USB sockets 11 are soldered onto circuit board 111, on which a voltage converter 112 is also directly positioned. The voltage converter is connected to the cable 13 and then to the plug 14. It is used to convert the operating voltage of the furniture drive supplied via cable 13 into a voltage suitable for the USB socket 11, in accordance with the USB specification a DC voltage of 5V. A DC voltage in the range from 24V to 30V is supplied via cable 13.

The voltage converter 112 is designed as a switching converter (step-down converter), wherein a high conversion efficiency in the range of 90% or more is achieved. A hybrid module is preferably used, which, in addition to integrated semiconductor components, also includes required passive elements such as inductors and/or capacitors. This makes it possible to achieve a particularly small size, which makes integration into the recess 12 a sensible option in the first place.

Due to the high conversion efficiency, the current in cable 13 acts in relation to the current supplied by the USB sockets 11 approximately inversely to the ratio of the input voltage to the output voltage of the voltage converter 112. The voltage ratio for the above voltages (24-30V versus 5V) is approximately in the range 5:1 to 6:1. Accordingly, the current in cable 13 is 5 to 6 times smaller than the current supplied by the USB sockets 11. At a specified maximum current, which the USB sockets 11 can supply, the cross-section of the wires in cable 13 can be selected to be 5 to 6 smaller by the same factor, without increasing losses in cable 13.

Figure 3:
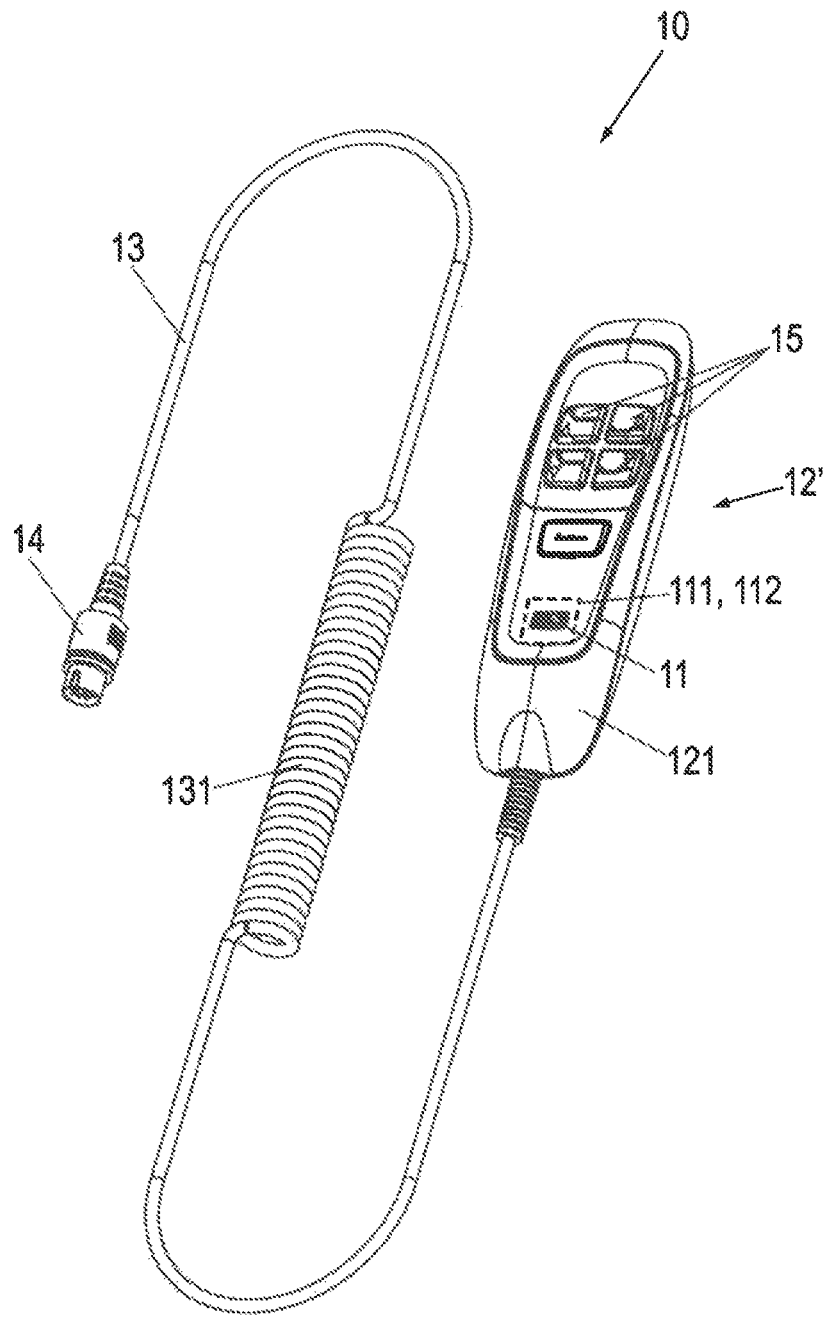
FIG. 3 shows an additional charging apparatus for use with an electromotive furniture drive.

FIG. 3 shows another embodiment example of a charging apparatus 10 that can be used in conjunction with the bed shown in FIG. 1, for example. In this case, the charging apparatus 10 has a manual control unit 12' or is integrated with it, wherein the manual control unit 12' is used to operate the electromotive furniture drive.

Accordingly, the housing 121 of the charging apparatus 10 is shaped as a hand-held device and carries operating elements 15, for example push-buttons, for operating the adjusting drives 7, 8 of the electric furniture drive, among other things.

Again, a USB socket 11 is arranged on the housing 121, which is easily accessible; in the present case exactly one USB socket 11 by way of example.

In FIG. 3 the circuit board 111, which carries the voltage converter 112, is shown dashed. It is located in the immediate vicinity of the USB socket 11 inside the housing 121 or the USB sockets 11 are soldered onto the circuit board 111. Cable 13 is designed as a spiral cable with a spiral section 131. The reduction of the current, which has to be transmitted via cable 13 to supply the USB charging socket 11, is particularly advantageous.

In cable 13, in addition to the cores which supply the input voltage for the voltage converter 112 (hereinafter referred to as supply cores), further cores (hereinafter referred to as control cores) may be present which are connected to the operating elements 15 and transmit control signals to the control device 9. Because the currents in the supply cores for the voltage converter 112 are 5 to 6 times smaller than with a direct supply to the USB socket 11, the supply cores can have the same (small) cross-section as the control cores. This allows the use of a standard spiral cable as cable 13.

In an alternative embodiment of the charging apparatus 10, the control information for the control device 9 may be digitally transmitted in serial coded form. In this case, only one control core (with common ground line) or two control cores are required in addition to the supply cores.

In a further development, the serially coded control information can be modulated onto the supply cores in the manner of a so-called PLC (Power Line Communication) transmission. In this case, only the two supply cores need to be present in cable 13.

The invention claimed is:

1. An electromotive furniture drive, comprising:
   an adjusting drive for electromotive adjustment of a movable furniture part relative to a further furniture part;
   a control device configured to actuate the adjusting drive;
   a voltage converter; and
   a charging apparatus including a charging connection connected to the voltage converter and supplying power to an external electronic device, said charging apparatus including a cable for connection to the control device or for connection to a power supply unit for supplying the control device, said cable leading from the control device or from the power supply unit to the voltage converter,
   wherein the cable is supplied by the control device with an operating voltage which is greater than a voltage which is provided at the charging connection.

2. The electromotive furniture drive of claim 1, wherein the operating voltage is greater by a factor of at least 4 than the voltage provided at the charging connection.

3. The electromotive furniture drive of claim 1, wherein the operating voltage is greater by a factor of at least 5 than the voltage provided at the charging connection.

4. The electromotive furniture drive of claim 1, wherein the operating voltage is between 24 and 30V and the voltage provided at the charging connection is 5V.

5. The electromotive furniture drive of claim 1, wherein the charging connection is a USB socket.

6. The electromotive furniture drive of claim 1, wherein the voltage converter is a switching converter.

7. The electromotive furniture drive of claim 1, wherein the voltage converter comprises a hybrid module in which a semiconductor component and a passive component are integrated.

8. The electromotive furniture drive of claim 7, wherein the passive component is a power-transmitting passive component.

9. The electromotive furniture drive of claim 7, wherein the hybrid module includes integrated therein a power-transmitting capacitor, whereas a power transmitting coil is located externally from the hybrid module.

10. The electromotive furniture drive of claim 1, further comprising a common circuit board on which both the charging connection and the voltage converter are arranged.

11. The electromotive furniture drive of claim 1, further comprising a mounting box configured for arrangement on a piece of furniture or embedded in a piece of furniture, said charging connection being built into the mounting box.

12. The electromotive furniture drive of claim 1, further comprising a manual control unit having operating elements for controlling the adjusting drive, said charging connection being built into the manual control unit.

13. The electromotive furniture drive of claim 1, wherein the cable is a spiral cable.

14. The electromotive furniture drive of claim 11, wherein the mounting box includes a housing, and further comprising a common circuit board on which both the charging connection and the voltage converter are arranged and which is installed in the housing of the mounting box.

15. The electromotive furniture drive of claim 12, wherein the manual control unit includes a housing, and further comprising a common circuit board on which both the charging connection and the voltage converter are arranged and which is installed in the housing of the manual control unit.

16. The electromotive furniture drive of claim 12, wherein the cable comprises supply cores connected to the voltage converter and control cores connected to the operating elements, with the supply cores and the control cores having a same conductor cross-section.

17. A piece of furniture, in particular sleeping or resting furniture, said piece of furniture comprising:
   a movable furniture part;
   a further furniture part; and
   an electromotive furniture drive including an adjusting drive for electromotive adjustment of the movable furniture part relative to the further furniture part, a control device configured to actuate the adjusting drive, a voltage converter, and a charging apparatus including a charging connection connected to the voltage converter and supplying power to an external electronic device, said charging apparatus including a cable for connection to the control device or for connection to a power supply unit for supplying the control device, said cable leading from the control device or from the power supply unit to the voltage converter, wherein the cable is supplied by the control device with an operating voltage which is greater than a voltage which is provided at the charging connection.

\* \* \* \* \*